Jan. 10, 1956
M. C. SVOBODA
2,730,183
TRACTOR-TRAILER CONTROL CONNECTION
AND ANTI-SLACK DEVICE THEREFOR
Filed March 24, 1952
2 Sheets-Sheet 2
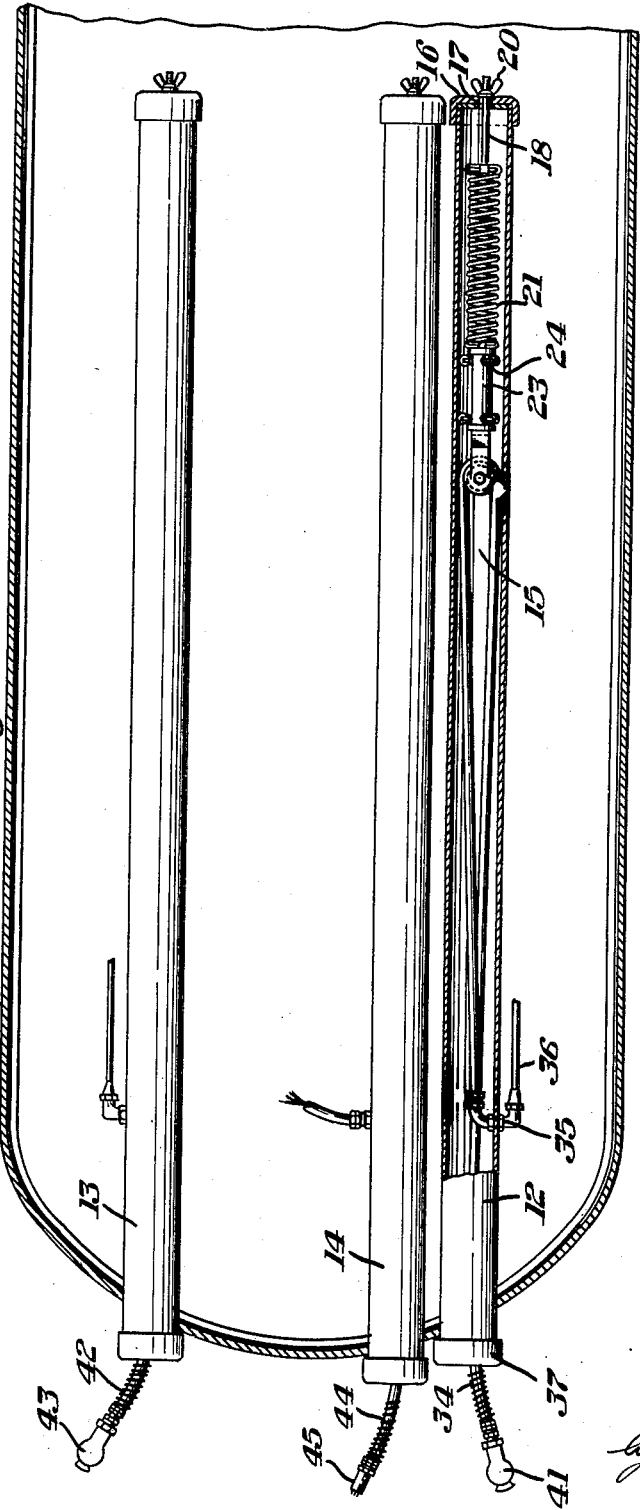
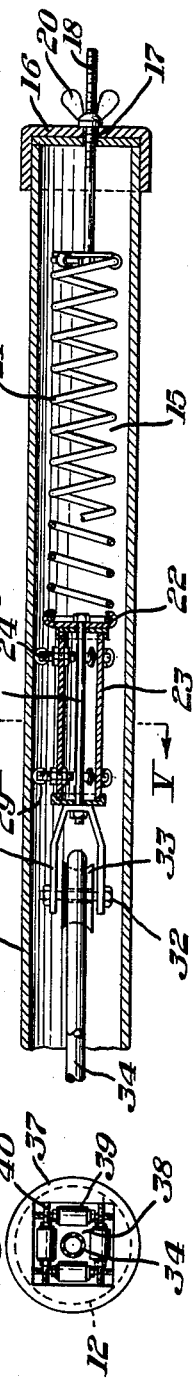
INVENTOR
Martin C. Svoboda
by Hooper, Leonard & Glenn
his attorneys

United States Patent Office 2,730,183
Patented Jan. 10, 1956

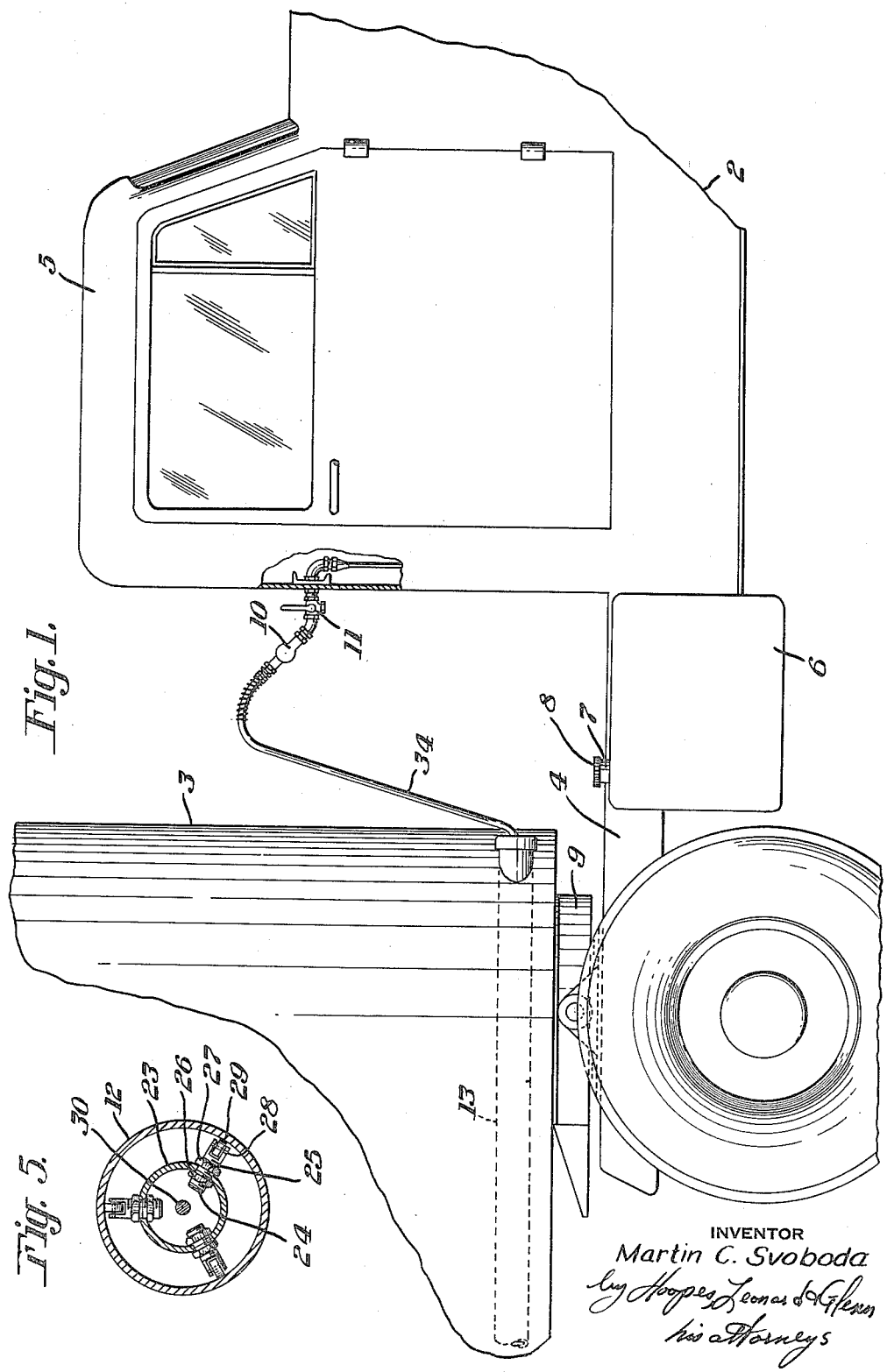

2,730,183

TRACTOR-TRAILER CONTROL CONNECTION AND ANTI-SLACK DEVICE THEREFOR

Martin C. Svoboda, Pittsburgh, Pa., assignor to Michael J. Hannon, Mount Lebanon, Pa.

Application March 24, 1952, Serial No. 278,198

3 Claims. (Cl. 180—14)

This invention relates to a tractor-trailer control connection and particularly to a control connection adapted to extend between an automotive tractor and a trailer which is adapted to be mechanically coupled to and uncoupled from the tractor, the control connection being for the purpose of transmitting a control medium such as compressed air, electricity or other control medium between the tractor and the trailer.

I provide a control connection between an automotive tractor and a trailer adapted to be coupled to the tractor comprising means forming a chamber within one of the tractor and trailer, an elongated flexible control element, a fixed connection between one end of the elongated flexible control element and the one of the tractor and trailer having the chamber, the elongated flexible control element having its other end projecting from the chamber for operative connection with the other of the tractor and trailer, and resilient means connected with the one of the tractor and trailer having the chamber and with the elongated flexible control element drawing the portion of the elongated flexible control element adjacent the second mentioned end thereof toward the one of the tractor and trailer having the chamber and into the chamber so that for any relative position of the tractor and trailer the portion of the elongated flexible control element spanning the space between the tractor and trailer is maintained substantially taut. The chamber is preferably a substantially elongated generally horizontal chamber and the resilient means are preferably generally horizontally arranged spring means extending generally longitudinally of the chamber. The control connection may be a fluid control connection and the elongated flexible control elements may be an elongated flexible hollow fluid conduit. The fixed connection between one end of the elongated flexible hollow fluid conduit and the one of the tractor and trailer having the chamber preferably provides for the passage of fluid through the connection at all times. The means forming the substantially elongated generally horizontal chamber may be connected with the under portion of the trailer, in which case the fixed connection is between one end of the elongated flexible control element and the trailer, the elongated flexible control element has its other end projecting from the chamber for operative connection with the tractor and the generally horizontally arranged spring means extending generally longitudinally of the chamber are connected with the trailer and with the elongated flexible control element.

Other details, objects and advantages of the invention will become apparent as the following description of a present preferred embodiment thereof proceeds.

In the accompanying drawings I have shown a present preferred embodiment of the invention in which Figure 1 is a fragmentary elevational view of a tractor and trailer coupled together and showing my control connection therebetween; in this figure only one control connection is shown for clarity, though three such connections are normally utilized in a tractor-trailer rig;

Figure 2 is a fragmentary view of the trailer, partly in plan and partly in horizontal cross section, showing portions of three control connections;

Figure 3 is a fragmentary longitudinal cross-sectional view to enlarged scale of a portion of one of the control connections;

Figure 4 is an end elevational view to enlarged scale of the forward end of the portion of one of the control connections which is mounted in the trailer, the elongated flexible control element being shown in cross section; and Figure 5 is a transverse cross-sectional view to enlarged scale taken on the line V—V of Figure 3.

Referring now more particularly to the drawings, I have shown a tractor 2 and a trailer 3 which except for the application thereto of my invention may be conventional. The tractor comprises a frame 4 mounted on two axles and carrying a prime mover which may for purposes of explanation be deemed to be a gasoline engine mounted at the forward end thereof. The tractor has the usual cab 5 containing the driver's controls. The frame 4 carries the gasoline tank 6 which has a projecting spout 7 normally closed by a cap 8. The frame 4 also carries the "fifth wheel" pad 9.

The tractor has an air compressor which is not shown in the drawings but may be of conventional construction. Connections within the tractor extend from the compressor to two coupling members one of which is shown at 10 disposed at the rear of the cab 5. A valve 11 is disposed in each of such connections adjacent the coupling member. Electrical connections extend from the battery and generator of the tractor to an electrical coupling member also disposed at the rear of the cab 5.

The trailer has one or more axles adjacent its rear end through which the rear end of the trailer is supported upon wheels as well known in the art. The front end of the trailer is adapted to lie upon the pad 9 when the trailer is coupled to the tractor. A coupling or king pin of conventional construction pivotally connects the trailer to the tractor so that the trailer and tractor may turn relatively to each other through a great angle. The body of the trailer 3 may take many forms.

Everything shown in the drawings which has thus far been specifically described may be conventional. I provide means forming a chamber within one of the tractor and trailer. In the example shown in the drawings the means forming a chamber is a pipe 12 which is connected with the under portion of the trailer and extends longitudinal thereof. Figure 2 shows three such pipes, the other two being designated 13 and 14, but since the three are the same detailed description of one will suffice.

The pipe 12 may be welded to the under side of the trailer with its forward end projecting slightly therefrom. The pipe 12 provides a chamber 15 for receiving an elongated flexible control element presently to be described. A cap 16 is applied to the rearward end of the pipe 12. The cap 16 may be a screw cap or may be fastened in place in any convenient manner. The cap 16 has a central opening 17 through which extends a bolt 18 having a head 19 at its forward end. A wing nut 20 is threaded on the bolt 18 and bears against the outer rear face of the cap 16. The head 19 is connected with the rear end of a tension coil spring 21 whose diameter is substantially less than the internal diameter of the pipe 12.

Connected with the forward end of the spring 21 at 22 is a mounting member 23 carrying studs 24 arranged in two annular series as shown in Figure 3. Each stud 24 passes through a bore 25 in the mounting member 23 and is held in position by inside and outside nuts 26 and 27 respectively. At its outer extremity each stud 24 is bifurcated as shown at 28 and has journaled therein a roller 29 riding on the inside of the pipe 12. Connected to the mounting member 23 by a bolt 30 is a clevis 31 in which is rotatably mounted upon a pin 32 a pulley 33.

An elongated flexible control element 34 enters the front end of the pipe 12 and extends about the pulley 33 and thence extends forwardly within the pipe 12 to a connection 35 in the side of the pipe 12 near the forward end thereof. A conduit 36 extends from the connection 35. If the control element 34 is for conveying compressed air to the compressed air tank in the trailer the conduit 36 extends to such tank.

At its forward end the pipe 12 is provided with a cap 37 which may be welded or otherwise appropriately fastened in place, the cap 37 having therein a central opening 38 defined by rollers 39 adjustably mounted upon axles 40 carried by the cap. The free end of the element 34 passes out through the opening 38 and is engaged by the rollers 39 which turn on the axles 40 and allow the element 34 to move back and forth without frictional drag on the rear end of the pipe. The free end of the element 34 carries a coupling member 41 adapted to be coupled to one of the coupling members disposed at the rear of the cab 5.

As above indicated, the control connections contained by the pipes 13 and 14 are similar to the control connection contained by the pipe 12. The pipe 13 may contain an elongated flexible control element 42 which may have at its free end a coupling member 43 which may be coupled to one of the coupling members disposed at the rear of the cab 5. The pipe 14 may contain an elongated flexible control element 44 which may have at its free end an electrical coupling member 45 which may be coupled to the electrical coupling member disposed at the rear of the cab 5. The element 42 may be the control air hose and the element 44 may be the electric light cable. The control air hose is connected with the valve means for admitting the compressed air from the tank to the brakes. The light cable is connected with the lights on the trailer.

All three of the control connections operate in the same manner so description of operation of one will suffice for all. The tension coil spring 21 at all times resiliently draws the elongated flexible control element 34 into the pipe 12. One end of the element 34 is fixed where it is joined to the connection 35. The other end of the element 34 passes straight rearwardly out of the end of the pipe 12 and through the opening 38 bounded by the rollers 39 to its connection with the tractor. The portion of the element 34 extending between the tractor and the trailer is at all times maintained subsantially taut or in a relatively straight line as shown in Figure 1 by the spring 21. Thus it is maintained out of contact wtih exterior portions of the tractor and trailer such as the gasoline tank including the spout and cap of the tractor and trailer, in all relative angular positions obviating the disadvantages above pointed out which have been inherent in all tractor-trailer control connections prior to my invention.

Access may be had to the interior of the pipe 12 by removing the cap 16. Adjustment of the tension of the spring 21 may be effected by turning the bolt 18.

While I have shown and described a present preferred embodiment of the invention it is to be distinctly understood that the invention is not limited thereto but may be otherwise variously embodied within the scope of the following claims.

I claim:

1. A fluid control connection between an automotive tractor and a trailer adapted to be coupled to the tractor comprising means forming a chamber within one of the tractor and trailer, an elongated flexible hollow fluid conduit, a fixed connection between one end of the elongated flexible hollow fluid conduit and the one of the tractor and trailer having the chamber providing for the passage of fluid through the connection at all times, the elongated flexible hollow fluid conduit having its other end projecting from the chamber for operative connection with the other of the tractor and trailer, and resilient means connected with the one of the tractor and trailer having the chamber and with the elongated flexible hollow fluid conduit drawing the portion of the elongated flexible hollow fluid conduit adjacent the second mentioned end thereof toward the one of the tractor and trailer having the chamber and into the chamber so that for any relative position of the tractor and trailer the portion of the elongated flexible hollow fluid conduit spanning the space between the tractor and trailer is maintained substantially taut.

2. A control connection between an automotive tractor and a trailer adapted to be coupled to the tractor comprising means forming within one of the tractor and trailer a substantially elongated generally horizontal chamber, an elongated flexible control element, a fixed connection between one end of the elongated flexible control element and the one of the tractor and trailer having the chamber, the elongated flexible control element having its other end projecting from the chamber for operative connection with the other of the tractor and trailer, and generally horizontally arranged spring means extending generally longitudinally of the chamber connected with the one of the tractor and trailer having the chamber and with the elongated flexible control element drawing the portion of the elongated flexible control element adjacent the second mentioned end thereof toward the one of the tractor and trailer having the chamber and into the chamber so that for any relative position of the tractor and trailer the portion of the elongated flexible control element spanning the space between the tractor and trailer is maintained substantially taut and free from looping.

3. A control connection between an automotive tractor and a trailer adapted to be coupled to the tractor comprising means connected with the under portion of the trailer forming a substantially elongated generally horizontal chamber, an elongated flexible control element, a fixed connection between one end of the elongated flexible control element and the trailer, the elongated flexible control element having its other end projecting from the chamber for operative connection with the tractor, generally horizontally arranged spring means extending generally longitudinally of the chamber connected with the trailer and with the elongated flexible control element drawing the portion of the elongated flexible control element adjacent the second mentioned end thereof toward the trailer and into the chamber so that for any relative position of the tractor and trailer the portion of the elongated flexible control element spanning the space between the tractor and trailer is maintained substantially taut and free from looping.

References Cited in the file of this patent

UNITED STATES PATENTS

| | | |
|---|---|---|
| 1,936,463 | Strang | Nov. 21, 1933 |
| 2,191,973 | Sommer | Feb. 27, 1940 |
| 2,266,264 | Reid | Dec. 16, 1941 |
| 2,380,765 | Keith | July 31, 1945 |
| 2,391,141 | Dour et al. | Dec. 18, 1945 |